United States Patent [19]

Furukawa

[11] 3,903,773

[45] Sept. 9, 1975

[54] APPARATUS FOR AUTOMATICALLY DISPENSING PACKED PHARMACEUTICALS

[75] Inventor: Mitsuo Furukawa, Sakai, Japan

[73] Assignee: Takeda Chemical Industries, Ltd., Osaka, Japan

[22] Filed: Nov. 5, 1973

[21] Appl. No.: 412,640

[30] Foreign Application Priority Data
Nov. 8, 1972  Japan.............................. 47-112321

[52] U.S. Cl. ...................... 83/208; 83/278; 83/250; 221/251; 221/270; 83/371
[51] Int. Cl.²..................... B26D 5/34; B65G 59/06
[58] Field of Search ............ 83/250, 278, 365, 222, 83/57, 208, 371; 221/251, 270, 13, 30

[56] References Cited
UNITED STATES PATENTS

| | | | |
|---|---|---|---|
| 430,499 | 6/1890 | Williams | 221/270 X |
| 1,060,291 | 4/1913 | Small | 83/278 |
| 1,859,372 | 5/1932 | Mutschler | 83/278 |
| 3,331,532 | 7/1967 | Tatsu Hori | 221/13 |
| 3,351,231 | 11/1967 | Shurtleff | 221/13 |
| 3,695,133 | 10/1972 | Finke | 83/222 X |

*Primary Examiner*—Willie G. Abercrombie
*Attorney, Agent, or Firm*—Larson, Taylor & Hinds

[57] ABSTRACT

An apparatus for automatically dispensing blister packs which comprises a base plate supporting a blister pack container, a discharging member for advancing a strip of blister packs one after another, said strip of blister packs being stacked in said container on said base plate, cutter means for cutting off the leading portion of the strip of blister packs being discharged from the container and means for controlling the cutter means to bring the cutter edge into operation when the cumulative amount of movement of the discharging member has reached a specified value, the container as installed in position on the base plate having a blister pack exit located in the path of movement of the discharging member, there being formed in the bottom of the container an opening for admitting the forward portion of said discharging member, said opening being communication with said blister pack exit.

20 Claims, 14 Drawing Figures

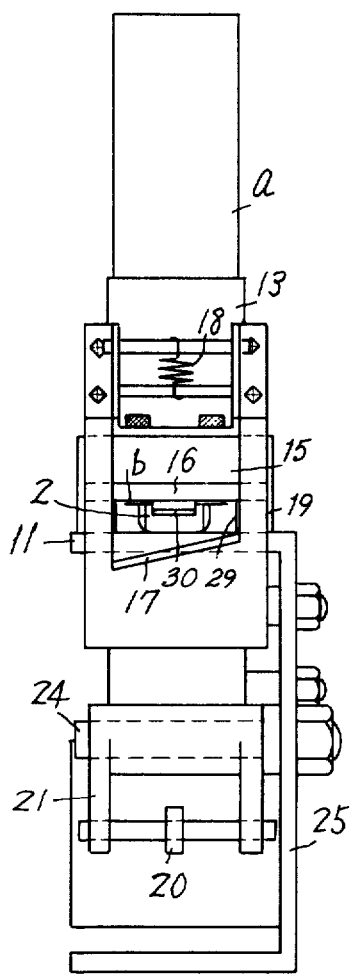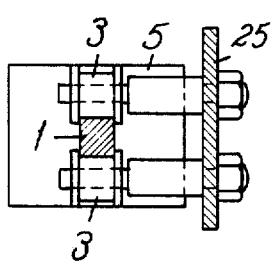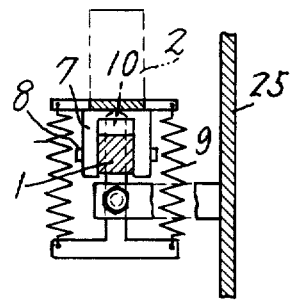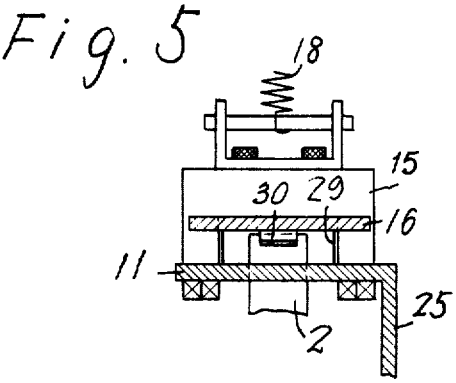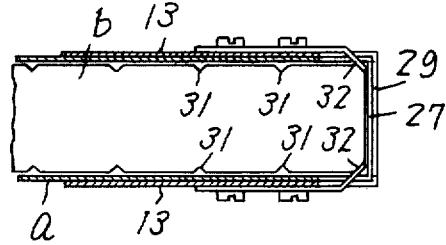

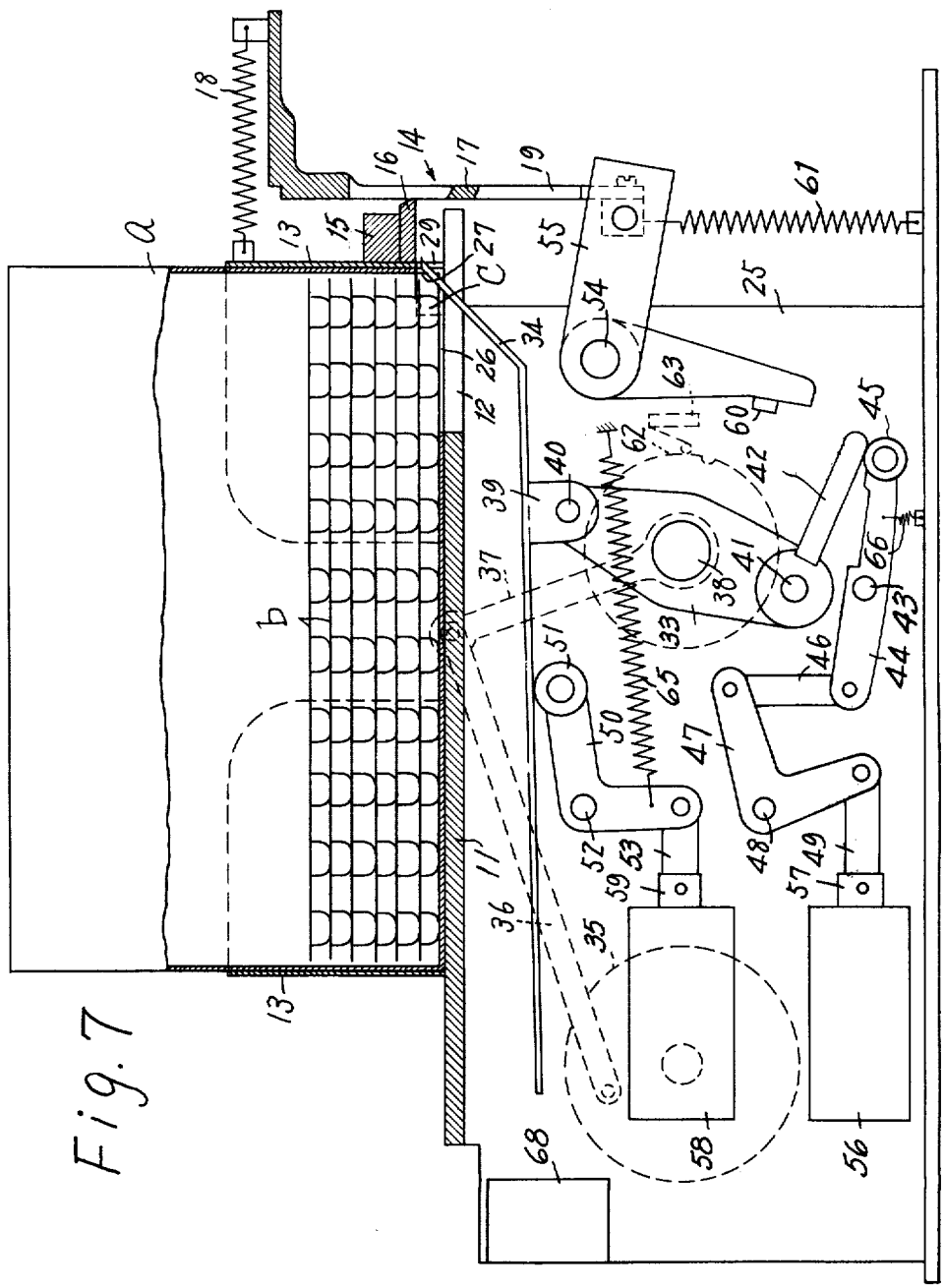

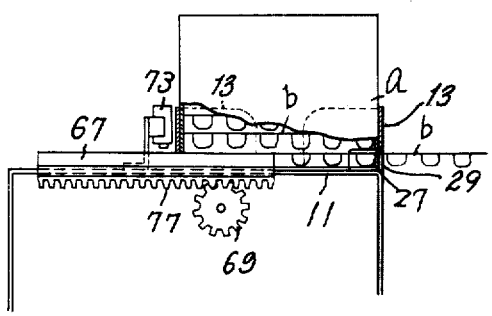
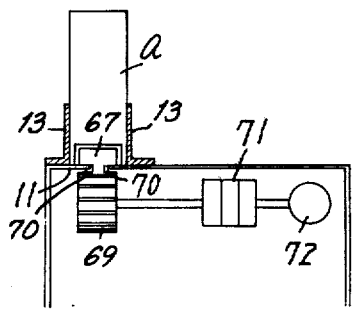
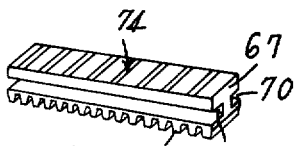
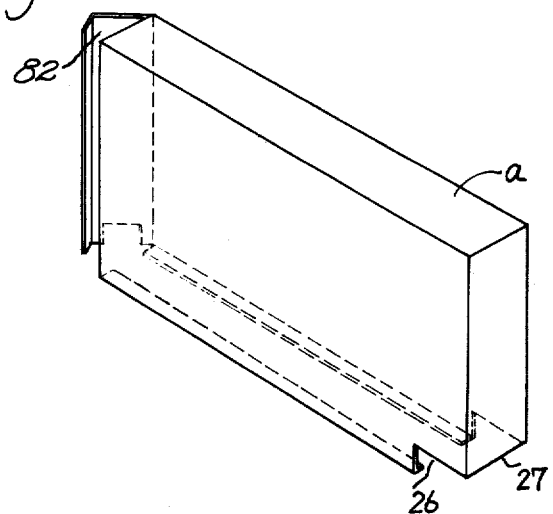

APPARATUS FOR AUTOMATICALLY DISPENSING PACKED PHARMACEUTICALS

This invention relates to an apparatus for automatically dispensing blister packs of pharmaceuticals.

The term "blister pack" as used throughout this specification hereinafter and the claims appended thereto means any and all packed pharmaceutical articles including tablets, capsules, powders, suppositories or the like as individually contained in a structure comprising a plastic shell premolded in the form corresponding to any of said articles and a film or sheet of cellophane, thermoplastic resin (e.g. of polyvinyl chloride, polypropylene or polyethylene), metal or other material which has been laminated or otherwise joined to said shell to form an integral unit in such a manner that one side of the unit has a plurality of projections serving as compartments for said pharmaceutical articles and the other side has a substantially flat, smooth surface, at least one of said shell and film or sheet being made of nonflexible material and said projections or compartments being axially arranged at substantially equal spacings. Among packs of the described type are those generally called peelable blister packs, press-through-packs and so forth.

Heretofore, there has not been available effective means for automatically counting and dispensing blister packs at hospitals, dispersaries, drug stores and other clinical and medication institutions. The intensive study undertaken by the present inventor to solve the above problem led to the development of apparatus which can automatically count and dispense blister packs, which apparatus is compactly built and not of intricate design and, accordingly, least prone to failures.

Therefore, it is an object of this invention to provide apparatus which can automatically withdraw, count and dispense blister packs from a container containing as stacked therein a plurality of blister packs.

Another object of this invention is to provide a medicine-dispensing apparatus which is simple in construction, durable and inexpensive and which lends itself to manufacture on a high production scale.

Still another object of this invention is to provide an apparatus which is compactly built so that a plurality of units thereof may be installed in rows in a confined space, from which blister packs can be automatically dispensed at various clinical and medication institutions.

Still another object of this invention is to provide an apparatus which lends itself to computerized dispensation of blister packs.

Still another object of this invention is to provide a container in which blister packs can be shipped from pharmaceutical works or dealers' stores to medication institutions or other users of pharmaceuticals, where the blister packs may thereby be automatically counted and dispensed by means of the present apparatus.

Other objects and features of this invention will become apparent as the following description proceeds.

The apparatus of this invention for automatically dispensing blister packs comprises a base plate supporting a blister pack container, a discharging member for advancing a strip of blister pack one after another, said strip of blister pack being stacked in said container on said base plate, cutter means for cutting off the leading portion of the strip of blister pack being discharged from the container and means for controlling the cutter means to bring the cutter edge into operation when the cumulative amount of movement of the discharging member has reached a specified value, the container as installed in position on the base plate having a blister pack exit located in the path of movement of the discharging member, there being formed in the bottom of the container an opening for admitting the forward portion of said discharging member, said opening being in communication with said blister pack exit.

The strips of blister packs to be stacked in the container are those cut to predetermined length. The container is dimensioned so that, when blister pack strips are placed therein, there is some suitable clearance between its inside walls on the one hand and the blister pack strips on the other in order to avoid possible deformation, e.g. bending or warping, and possible misalignment of the strips of blister packs while the loaded container is in transit.

According to this invention, the blister pack container, as placed in position on the base plate, has its blister pack exit located in the path of movement of the discharging member. Likewise, when installed in position, the container permits the bottom opening thereof to be positioned in the path of movement of the discharging member.

The container may be made of metal (e.g. aluminum, stainless steel, etc.), synthetic resin, cardboard, etc., and may be either locally provided with a sight hole or be made in part of a transparent material, from or through which one may see the strips of packs inside. Furthermore, in the preferred embodiments of this invention which will be described hereinafter with reference to the accompanying drawings, the container is dismountable from the base plate, when the strip of blister packs contained has been exhausted, to be replaced with a new one containing a fresh load of blister packs. If the container is made of synthetic resin or cardboard, for instance, it can be disposed of when its contents have been exhausted.

The containers of this disposable type are convenient, for such containers may be shipped directly from pharmaceutical plants or dealer's stores to hospitals and other dispensaries and can be thrown away after the blister packs have been completely dispensed. It should be understood that although the container is dismountable in the embodiments to be described hereinafter with reference to the accompanying drawings, it may be rigidly mounted on the base plate, in which even it is replenished with strips of blister packs when or just before it becomes empty.

In the case were the container of this invention is of the type dismountable from the base plate, the container is adapted to be retained in position on the base plate against possible displacement by holder means which comprises, for example, a pair of front and rear groove-shaped support members fixedly mounted on the base plate in opposing relation to each other and permitting the container to be inserted therein.

The discharging member for advancing the strip of blister packs is in the form of a discharging pawl or a pushing bar which is movable a specified distance back and fourth by suitable drive means such as a solenoid, motor, etc.

The cutter means of this invention comprises a fixed cutter blade disposed close to the blister pack exit and a blade movable toward the fixed blade.

The means for controlling the cutter means to operate the same with the desired timing comprises, for example, a counter or preset counter adapted to feed, when required, an energizing signal to a solenoid for actuating the cutter means into operation.

According to the preferred embodiment of this invention, the discharging member to advance the strip of blister packs from the container comprises a discharging pawl pivoted to a motion member which is linearly movable a specified distance back and forth in repetition. The discharging pawl is constructed so that it is movable past the projection of the blister pack without being thereby arrested when it is retracted by the motion member and is engageable with the projection to advance the strip when it is advanced by the motion member.

In another embodiment of this invetion, the discharging member comprises a discharging pawl pivoted to a lever which is pivotally repeated movable back and forth about an axis through a specified angle, the discharging pawl being operable in the same manner as one described above.

With the foregoing two embodiments, strips of blister packs are stacked face down in the container, i.e. with the projections thereof directed toward the bottom of the container, the container being in position on the base plate with the bottom opening permitting entry of the discharging pawl. When the container is set in position, the projection side of the lowermost strip of blister packs therein is located in the path of movement of the discharging pawl, so that when driven the discharging pawl intermittently advances the lowermost strip of blister packs toward the exit of the container in pushing contact with the projections of the packs in succession to discharge the same from the exit. It should be understood that in the above embodiments, the apparatus is substantially free of rotary elements and, therefore, are not only least prone to troubles and failures but also are highly reliable in operation.

The two embodiments described preferably include means for arresting the strip of blister packs against retraction, said means being positioned above the base plate to obviate the possibility of the discharging pawl in its backward travel retracting the strip of blister packs in sliding contact with the projection and to thereby assure reliable dispensing operation all the time. The arresting means may comprise, for example, arresting pawl consisting of plate springs fixed to the holder means for the container. This arresting pawls are engageable in notches preferably formed in the side edges of the strip of blister packs.

Still another embodiment of this invention includes, as the discharging member for withdrawing strips of blister packs from the container, a pusing bar which is adapted to push out a strip of blister packs from the container without retraction in a single forward travel.

As already described, the container accommodating the strip of blister packs is securely mounted, or set in position, on the base plate. With the container located in this position, the pushing bar is at first located behind the trailing or rear end of the lowermost strip of blister packs. The lowermost strip of blister packs is pushed toward the exit of the container and withdrawn from the exit by the forward travel of the pushing bar.

Each of the embodiments of this invention described above includes controlling means which actuates the cutter to cut off the leading portion of the strip of blister packs withdrawn from the exit of the container when the number of strokes of the discharging member, namely the number of blisters packs withdrawn, has reached a prescribed value. In this manner, the strip of blister packs is cut just behind the pack that completes said prescribed number.

According to this invention, the prescribed number may be smaller than, or equal to, or greater than the number of blister packs included in one strip. In the last case, operation continues to dispense one strip of blister packs and then the following strip or strips in succession until the number of withdrawn blister packs reaches the prescribed number.

The relationship between the number of strokes of the discharging member and the number of blister packs withdrawn described above refers to the case wherein one pharmaceutical article is contained in each compartment or hollow projection of the strip of blister packs. According to this invention, however, two or more articles may be accommodated in each projection, in which case the prescribed number is the prescribed number in the former case multiplied by two or a greater integer corresponding to the particular number of articles. Further according to this invention, the strip of blister packs may consist of projections arranged in one or more rows in the direction of withdrawal of the strip.

The embodiments of this invention wherein the discharging member comprises the aforementioned discharging pawl employ a system in which the number of blister packs withdrawn is detected by a counter which counts the strokes of the discharging pawl or another system in which the desired number of strokes of the discharging pawl, which may be varied, is preset on a preset counter which can detect the moment when the cumulative total number of strokes of the discharging pawl, namely the prescribed number of blister packs withdrawn, has coincided with the preset number. In either case, the detection thus effected regulates the timing of operation of the cutter means.

In the embodiment of the present invention wherein the pushing bar serves as the discharging member, the bar is provided with optical signal tracks or magnetic signal tracks arranged in parallel at spacings corresponding to the pitch of projections of the blister packs, the system being such that the tracks are scanned by a photoelectric converter or magnetic pickup to detect the number of blister packs withdrawn in terms of the number of strokes of the pushing bar.

With the use of the present apparatus having the foregoing construction, strips of blister packs are automatically withdrawn in succession from the container containing a stack of strips whilst the packs so withdrawn are counted and the strip of packs is cut just behind the pack that completes said prescribed number.

Provided that the discharging member comprises the aforementioned discharging pawl, the stroke of the discharging member is set at a value equal to the pitch of projections of the strip of blister packs or may be set at twice or more times the pitch.

In the case where the strip of packs is cut with the rearmost few packs left, these packs may possibly be forced out due to the impact of cutting. To avoid this for reliable counting and dispensing operations, means for preventing the blister packs from rising is preferably disposed close to the blister pack exit. To this end, a plate spring, for example, may be secured to a support for the fixed blade of the cutter means.

The present invention will be described below in further detail, referring to the accompanying drawings which show preferred embodiments.

FIG. 2 is a side elevation of the same;

FIG. 3 is a view in section taken along the line III—III of FIG. 1;

FIG. 4 is a view in section taken along the line IV—IV of FIG. 1;

FIG. 5 is a view in section taken along the line V—V of FIG. 1;

FIG. 6 is a view in section taken along the line VI—VI of FIG. 1;

FIG. 7 is a front view showing another preferred embodiment of this invention;

FIG. 9 is a front view showing another preferred embodiment of this invention;

FIG. 10 is a side elevation of the embodiment shown in FIG. 9;

FIG. 11 is a perspective view of a pushing bar included in the embodiment of FIGS. 9 and 10;

FIG. 13 is a perspective view showing another example of the container; and

Figure 1:
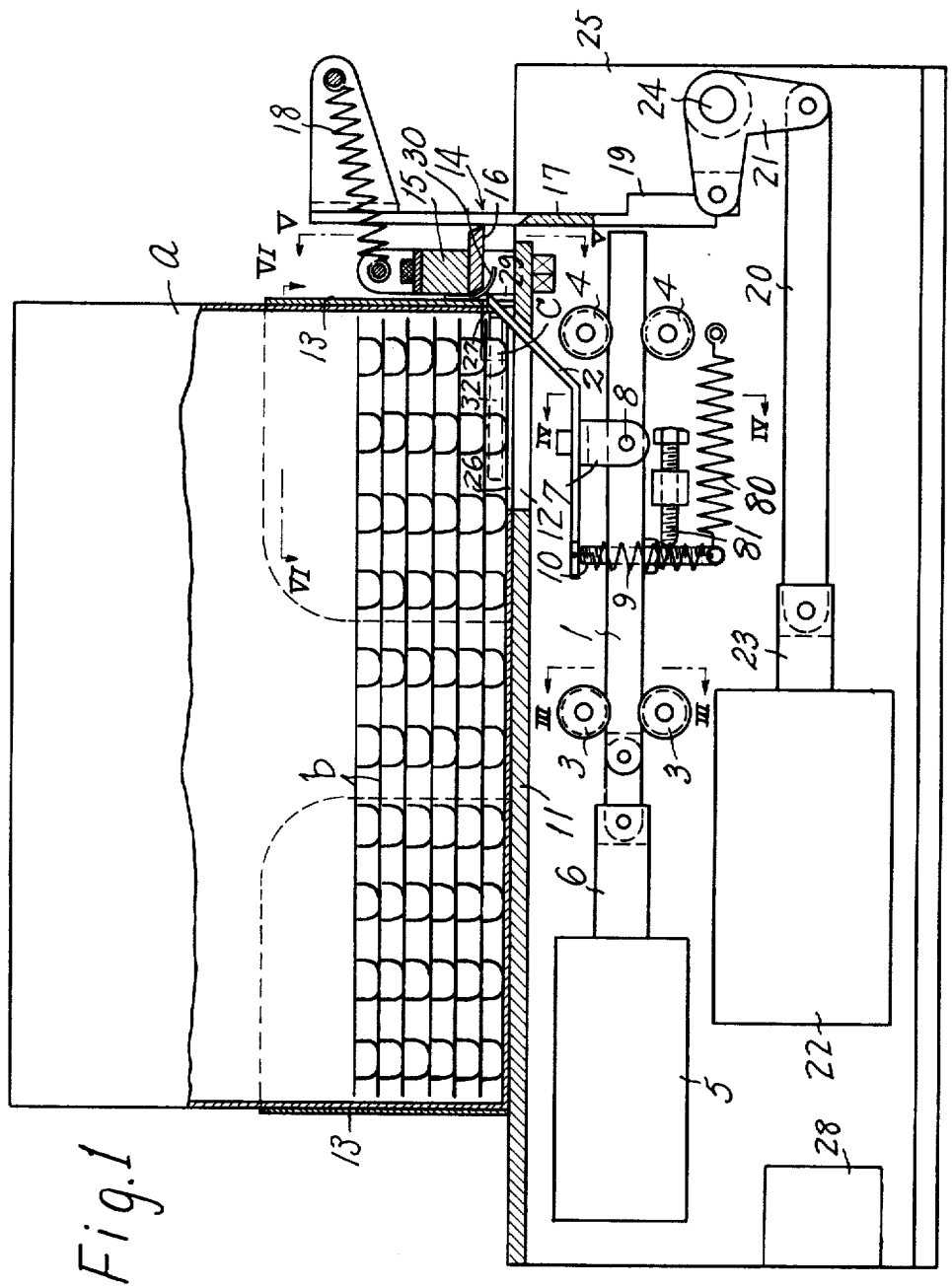
FIG. 1 is a front view showing a preferred embodiment of this invention.

In FIGS. 1 to 6 a member for discharging blister pack strip *b* from a container *a* comprises a discharging pawl 2 pivoted to a motion member 1 repeatedly moveable a specified distance back and forth linearly.

The motion member 1 is supported by pairs of upper and lower support rollers 3,3 and 4,4 disposed at fixed positions and is movable back and forth (i.e. rightward and leftward in FIG. 1) in a linear manner by being guided by the rollers. The motion member 1 is connected at its rear end to the distal end of a plunger 6 of a solenoid 5 and is adapted to move back and forth repeatedly by virtue of the repetition of energization and deenergization of the solenoid 5.

The discharging pawl 2 is fixedly provided, at an intermediate portion thereof, preferably at a portion where the centroid of the pawl exists or a portion close thereto, with an inverted U-shaped member 7 which is pivotally supported by a pin 8 on the motion member 1. The discharging pawl 2 is lightly pulled downward at its rear end by a tension spring 9 and is thereby biased in a counterclockwise direction in FIG. 1. The counterclockwise movement of the discharging pawl 2 thus biased is limited by a stopper 10 in the form of an adjust screw. The motion member 1 is pulled by a tension spring 80 rightward in FIG. 1 through the stopper 10 provided thereon. The rightward displacement of the motion member 1 is limited by the contact of the stopper 10 with a stopper 81.

A base plate 11 for setting the blister pack container *a* in position has a slot 12 through which the distal end of the discharging pawl 2 extends and in which the discharging pawl 2 is movable to advance the strip of blister packs *b* by one pack at a time intermittently. A pair of support members 13 and 13 in the form of a groove (see FIG. 6) for inserting the container *a* are mounted on the base plate 11. The container *a* is set in position when fitted in between the support members 13 and 13.

A cutter means 14 for cutting the strip of blister packs into pieces each including a specified number of packed articles comprises, in the illustrated embodiment, a horizontal blade 16 fixed to a support 15 on the base plate 11 and a vertically movable blade 17 supported by a support frame 19. The support frame 19 is held in pressing contact with the fixed blade 16 by a tension spring 18 and has a lower end linked to one end of a rod 20 by a lever 21. The other end of the rod 20 is connected to the plunger 23 of a solenoid 22. The lever 21 is pivotally supported at an intermediate portion thereof by a pin 24 on a side frame 25 integral with the base plate 11.

Figure 12:
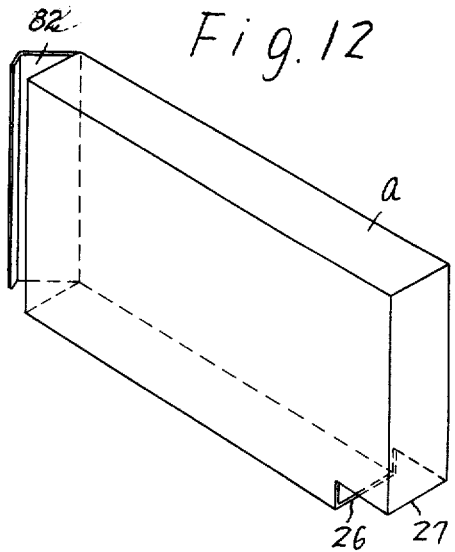
FIG. 12 is a perspective view showing an example of the container.

In the bottom of the container *a* there is formed an opening 26 for permitting the distal end of the discharging pawl 2 to enter the container *a* placed between the support members 13 and 13 on the base plate 11. According to this embodiment, the container *a* is made of cardboard and has a lid 82 which is openable to place the blister pack strips (FIGS. 12 and 13). The opening 26 is formed in the front end of bottom of the container *a* as shown in FIG. 12. Alternatively, the opening 26 may extend throughout the whole length of the bottom as seen in FIG. 13. The container *a* also has a blister pack exit 27 which is adapted to be positioned in the path of movement of the discharging pawl 2 when the container *a* is placed between the support members 13 and 13. At the position where the exit 27 is located, the front support member 13 is formed with an opening 29 through which the strip of blister packs *b* is sent out.

A preset counter 28 mounted on the side frame 25 is coupled to the solenoid 5 for the motion member 1. The emission frequency of signals preset on the counter 28 determines the frequency of repeated energization of the solenoid 5, namely the number of strokes of the discharging pawl 2. The preset counter employable in this invention may be of the known type and can be coupled to the solenoid 5 by conventional means. Accordingly, the counter is shown only schematically and the coupling means is omitted in the drawing.

Adjacent the blister pack exit 27, a thin plate spring 30 is fixed to the support 15 to prevent the strip of blister pack *b* from being upwardly displaced.

Each of the strips *b* accommodated in the container *a* has notches 31 in its opposite side edges (see FIG. 6). The support member 13 is provided with arresting pawls consisting of a pair of thin plate springs 32 adapted to engage with the notches 31 (see FIG. 6).

FIG. 1 shows the blister pack container *a* as positioned in between the support members 13 and 13 on the base plate 11 and the discharging pawl 2 at the extremity of its forward movement. In this condition the solenoids 5 and 22 remain deenergized.

The bottom opening 26 of the container *a* on the base plate 11 is substantially in register with the slot 12 in the base plate 11, the blister pack exit 27 communicating with the opening 29. A number of strips of blister packs *b* are stacked face down in the container *a* as shown in FIG. 1.

If the solenoid 5 is energized repeatedly with signals emitted intermittently from the preset counter 28 in the above-mentioned state, the plunger 6 of the solenoid 5 moves a specified distance back and forth repeatedly, causing the motion member 1 to move the specified distance linearly back and forth in repetition. Consequently, the motion member 1 moves the discharging pawl 2 back and forth. When moving backward (i.e. leftward in FIG. 1) along with member 1, the discharging pawl 2 comes into contact with one of the projections c of the lowermost blister pack strip b in the container a and moves past the projection c by being turned about the pin 8 in a clockwise direction in FIG. 1 by the projection c as if by pushing without being thereby caught. Conversely, when advancing rightward in FIG. 1, the tip of the dischrging pawl 2 engages the rear base portion of the projection c while being prevented from counterclockwise displacement by the stopper 10. Accordingly, the discharging pawl 2 acts to advance the blister pack strip b rightward in FIG. 1.

In this way, the lowermost blister pack strip b in the container a is sent outward intermittently through the exit 27 and opening 29 by virtue of the repeated reciprocation of the discharging pawl 2. The stroke of the discharging pawl 2 is preset to a valve equal to the axial pitch of projections c value of the blister pack strip b or to twice or more times the above value.

Upon termination of the emission of intermittent signals from the preset counter 28, the plunger 6 of the solenoid 5, motion member 1 and discharging pawl 2 return to the positions they assumed before the initiation of operations At the same time, the preset counter 28 applies an energizing signal to the solenoid 22, which is thereby energized. The means for coupling the counter 28 to the solenoid 22 is known and is therefore omitted in the drawing.

The solenoid 22, when energized, causes the plunger 23 to raise the movable blade 17 through a rod 20, lever 21 and frame 19, allowing the movable blade 17 to coact with the fixed blade 16, to cut the blister pack strip b withdrawn from the exit 27 just behind the blister pack with which the prescription is fulfilled.

If the emission of signals from the preset counter 28 to the solenoid 5 still continues after one blister pack strip has completely been discharged, namely when the apparatus has been set to fulfill a prescription that required more than one strip of blister packs, the apparatus keeps operating to advance a second strip of blister packs.

The total number of the blister packs to be withdrawn can be freely changed by varying the frequency of emission of signals to be preset on the counter 28.

With the apparatus of the type shown in FIGS. 1 to 6, the discharging pawl 2 will not push up the blister pack strip b within the container a when moving backward, so that the strip of blister packs once withdrawn will not be retracted, because the discharging pawl 2 is pivoted to the reciprocally linearly movable motion member 1 and is not allowed to raise its tip when moving backward. In addition, the arresting pawls 32 are adapted to engage in the notches 31 formed in the opposing side edges of the blister pack strip b to prevent any retraction of the blister pack strip b. The apparatus further includes the plate spring 30 for preventing the blister pack strip b from being raised. These features therefore assure a positive cutting operation even in such a situation where, after cutting, only the rearmost pack in the strip will be left behind.

Figure 8:
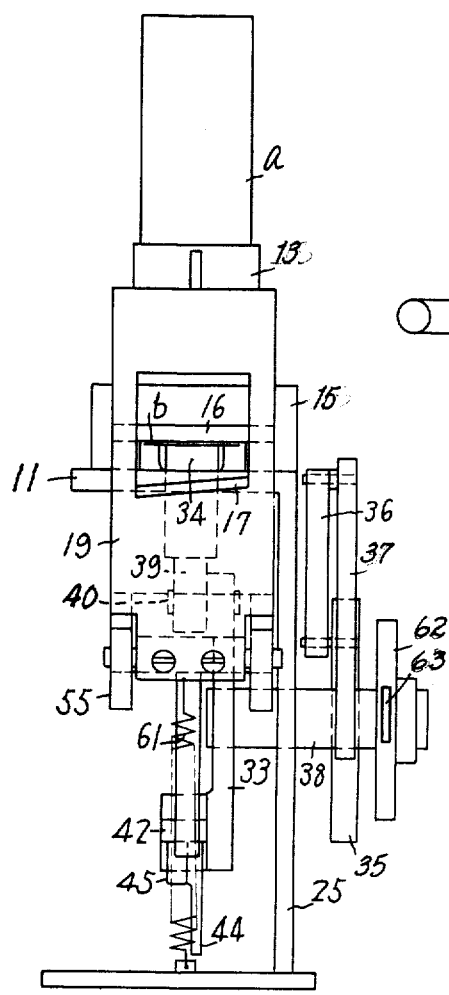
FIG. 8 is a side elevation of the embodiment shown in FIG. 7.

In FIGS. 7 and 8 showing another preferred embodiment of this invention the blister pack discharging member comprises a discharging pawl 34 pivoted to a lever 33 which is pivotally repeatedly movable back and forth (i.e. rightward and leftward in FIG. 7) about an axis through a specified angle. In FIGS. 7 and 8 the same parts as those in FIGS. 1 to 6 are referred to by the same reference numerals. This embodiment is adapted for use with the same container a as employed in the embodiment of FIGS. 1 to 6.

According to the embodiment shown in FIGS. 8 and 8, the lever 33 is fixed to a pivot 38 which is reciprocally movable through a specified angle about its axis by a disc crank 35 through connecting rods 36 and 37. The discharging pawl 34 has at its intermediate portion a projection 39 extending downward and pivoted by a pin 40 to one end of the lever 33. Pivoted by a pin 41 to the other end of the lever 33 is one end of a lever 42, the other end of which rests on a roller 45 at the front end of a lever 44 pivoted by a pin 43 to the side frame 25. The rear end of the lever 44 is connected to the plunger 57 of a solenoid 56 through a connecting rod 46, a lever 47 pivotally movable about a pin 48 and a connecting rod 49.

The discharging pawl 34 has an elongated rear end, so that the pawl 34 tends to turn, about the pin 40, in a counterclockwise direction in FIG. 7 all the time. The pawl 34 further bears, at a portion thereof rearwardly of the pin 40, on a roller 51 at the front end of a lever 50 which is pivotally supported by a pin 52 on the side frame 25. The rear end of the lever 50 is linked to the plunger 59 of a solenoid 58 by a connecting rod 53.

Connected to the frame 19 supporting the movable blade 17 of the cutter means 14 is one end of a lever 55 that is pivotally movable about a pin 54. As will be described hereinafter, the lever 55 has at its rear end a portion 60 to be pushed. The lever 55 is further provided with a tension spring 61 for automatically restoring the movable blade frame 19 to position.

With the apparatus shown in FIGS. 7 and 8, the blister pack container a is set in position, with the blister pack strips b being placed in the container a in the same manner as in the embodiment of FIGS. 1 to 6.

FIG. 7 shows the state of the parts while the solenoid 58 is energized and the solenoid 56 is deenergized. When the crank 35 is driven in this state, the pivotal lever 33 is repeatedly pivotally moved a specified angle back and forth (i.e. rightward and leftward in FIG. 7) about the pivot 38, by the crank 35 through the rods 36 and 37 and pivot 38. The lever 33 therefore moves the discharging pawl 34 a specified distance back and forth repeatedly. While the lever 33 is in motion, the lever 42 on the lever 33 is kept out of contact with the portion 60, with the result that the movable blade 17 will not be driven, because by virtue of the deenergized state of solenoid 56, the tension spring 66 keeps the lever 44 pulled down to hold the roller 45 on the front end of the lever 44 at a lower position of the distal end of the lever 42 located at a level lower than the portion 60.

Like the discharging pawl 2, when receding the pawl 34 moves back past the exposed blister pack projection c of the lowermost strip without being thereby arrested. When advancing, the discharging pawl 34 advances the blister pack strip in the same way as the discharging pawl 2.

Consequently, the blister pack strip b is advanced out from the exit 27 and opening 29 intermittently by the discharging pawl 34. The stroke of the discharging pawl 34 is previously set to a value equal to the axial pitch of the projections c of strip of blister pack b or to twice or more times the value.

The number of forward strokes of the discharging pawl 34, namely the number of blister packs withdrawn is counted by a counter 68. The counter 68 is coupled to a switch 63 by known means. The switch 63 is turned on and off every time the pawl 34 performs one cycle of forward and backward movements, by a cam 62 which is repeatedly moved back and forth in timed relation to the pivotal lever 33. The signals from the switch 63 are transmitted to the counter 68 which counts the number of the signals so received.

When the number counted by the counter has reached a predetermined number, the counter applies a reset signal to the solenoid 58 and an energizing signal to the solenoid 56 at the same time. The reset signal and energizing signal are sent by methods already known.

Upon deenergization of the solenoid 58, a spring 65 which has been tensioned turns the lever 50 counterclockwise in FIG. 7, causing the roller 51 to turn the discharging pawl 34 in a clockwise direction in FIG. 7 about the pin 40, with the result that the forward end of the pawl 34 moves down from the level of the projection c of the blister pack strip b. Accordingly, despite the motion of the crank 35, the discharging pawl 34 will not advance the blister packs.

The solenoid 56, when energized, causes the plunger 57 to turn the lever 44 in a counterclockwise direction in FIG. 7 through the rod 49, lever 47 and rod 46, thereby shifting the roller 45 to an elevated position. As a result, the lever 42 with its distal end resting on the roller 45 turns about the pin 41 in a counterclockwise direction in FIG. 7 to bring the distal end to the position opposing the portion 60. The forward movement of the lever 42 caused by the pivotal lever 33 as it turns counterclockwise in FIG. 7 therefore brings the distal end into pushing contact with the portion 60. This turns the lever 55 in a counterclockwise direction against the action of the tension spring 61 to drive the frame 19 of the movable blade. Consequently, the movable blade 17 coacts with the fixed blade 16 to cut the blister pack strip b. In this way, the blister pack strip is cut to provide a prescribed number of blister packs.

If the apparatus of FIGS. 7 and 8 is set for dispensing a large number of blister packs which is greater than the packs included in a single strip or in the residue of the lowermost strip in the container, the preset number on the counter 68 remains yet to be reached to advance the next strip. With this type of apparatus the number of the blister packs to be dispensed to a given prescription can be changed greatly by varying the specified number preset on the counter 68.

Instead of employing the system in which the number of blister packs to be discharged is controlled by the counter 68, the apparatus of FIGS. 7 and 8 may adopt the foregoing system which uses the preset counter 28 of the apparatus of FIGS. 1 to 6. Likesise, the apparatus of the type shown in FIGS. 1 to 6 may employ the discharge amount controlling system used in the apparatus of FIGS. 7 and 8, in place of the above-described system involving the preset counter 28.

The embodiment of the type shown in FIGS. 7 and 8 may include, where desired, means for preventing retraction of the blister pack strip (not shown) and means for preventing rising of the strip (not shown) as used in the first embodiment.

FIGS. 9 to 11 show another embodiment including a blister pack discharging member comprising a bar 67 by which the blister pack strip is pushed out without retraction of the bar 67 in a single forward movement. In FIGS. 9 to 11 the same parts as used in FIGS. 1 to 8 are referred to by the same reference numerals. Although the blister pack cutter means and means for controlling the operation of the cutter means are not shown in FIGS. 9 to 11, the apparatus of this type incorporates means similar to those disclosed for the preceding embodiments. The container a used in the apparatus of the type shown in FIGS. 9 to 11 is one having an opening 26 which is formed throughout the entire length of bottom of the container as illustrated in FIG. 13.

The pushing bar 67 is formed in its under surface a rack 77 meshing with a pinion 69. The pushing bar 67 has in its opposite sides grooves 70 and 70 in which the side edges of the slot 12 in the base plate 11 fit in sliding fashion. The pinion 69 is driven by a reversible motor 72 by way of an electromagnetic clutch 71 incorporating an unillustrated brake.

The pushing bar 67, when advanced by the pinion 69, pushes the lowermost blister pack strip b forward and sends out the same from the container a on the base plate 11 through the exit 27 and opening 29.

The number of the blister packs to be sent out, namely the amount of forward movement of the pushing bar 67, is detected by a photoelectric converter 73 which scans the optical signal tracks 74 provided in parallel on the upper surface of the pushing bar 67 and spaced apart by a distance equal to the axial pitch of projections of the blister pack strip b. When the detected cumulative amount of movement of the pushing bar 67 has reached a preset value, the electromagnetic clutch 71 is disengaged.

To control the operation of clutch 71, the number of discharged blister packs detected by the scanning operation is counted by an unillustrated counter, and when the counted number has reached the specified value, the counter applies a reset signal to the electromagnetic clutch 71.

Simultaneously with the disengagement of the clutch 71, the unillustrated brake built in the clutch 71 functions to stop the pushing bar 67 and the motor 72. These may be stopped by a system already known.

When the pushing bar 67 has been brought to a halt, the unillustrated cutter means operates to cut the strip of blister packs, fulfilling the prescription. The cutter means may be operated by the same means as used in the embodiments already described.

If the preset specified number of packs to be dispensed to a given prescription is great and the counted number is less than the preset number when the pushing bar 67 has completed its single forward travel, namely when it has completely sent out one blister pack strip, the motor 72 will be brought into reverse rotation by means already known upon the pushing bar 67 reaching the extremity of its forward travel so as to move the pushing bar 67 backward. Subsequently, at the extremity of backward travel of the pushing bar 67, the motor 72 is brought into normal rotation to advance the pushing bar 67 again. The cycle of this operation is repeated until the counted number reaches the preset specified number.

With the embodiment of FIGS. 9 to 11, the number of blister packs to be dispensed may be varied in the same manner as in the embodiments already described.

If desired, the present embodiment may likewise include means for preventing the blister pack strip from rising as in the preceding embodiments (not shown in FIGS. 9 to 11).

Figure 14:
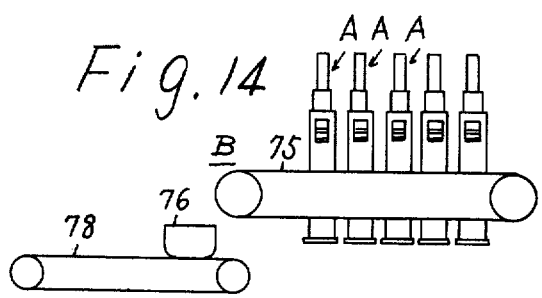
FIG. 14 is a front view schematically showing the apparatus of this invention as it is used in combination with an equipment for handling the blister packs dispensed.

The apparatus of this invention may be used in combination with another apparatus for handling the dispensed blister packs, for example, with apparatus for collecting dispensed blister packs of two or more kinds as shown in FIG. 14.

With reference to FIG. 14, several units of the apparatus A of this invention are installed in combination with apparatus B. The apparatus A thus arranged side by side are equal in number to the kinds of blister packs to be grouped together and are connected to the apparatus B.

The blister packs dispensed by these units of apparatus A are transferred onto a belt conveyor 75 included in apparatus B and placed in a container 76, which are then transferred to a desired place by a belt conveyor 78 or some other suitable means.

I claim:

1. An apparatus for automatically dispensing blister packs which comprises a base plate supporting in position thereon a blister pack strip container holding therein blister pack strips, said base plate being provided with a slot; a discharging member for advancing a strip of blister packs one after another, the distal end of said discharging member extending upward through said slot; said strips of blister packs each having a relatively smooth surface on one side and a plurality of projections which serve as compartments for pharmaceutical articles and are axially arranged at substantially equal spacings on the opposite side, said strips of blister packs being stacked in said container with the projections face down and with the relatively smooth surfaces face up, said container having at the bottom thereof an opening which communicates with the slot of the base plate when said container is set in position on said base plate, said container further having a blister pack exit in communication with said opening, said exit being provided so as to be located in the path of movement of the discharging member when said container is set in position on said base plate; means for moving said discharging member repeatedly a specified distance back and forth; means for effecting engagement of said discharging member in its forward travel with one of said projections of a blister pack strip to advance the lowermost blister pack strip a predetermined amount and for preventing in its backward travel past the projections of blister pack strip any arresting or retracting of the strip of blister packs by said discharging member; cutter means for cutting off the leading portion of the strip of blister packs discharged from said container; and means for controlling the cutter means to bring the cutter edge into operation when the cumulative amount of movement of the discharging member has reached a predetermined value.

2. The apparatus as set forth in claim 1 wherein the discharging member comprises a discharging pawl pivoted to a motion member which is repeatedly and linearly movable a specified distance back and forth, said discharging pawl being movable past the projection of the blister pack without being thereby arrested when retracted by said motion member and engageable with the projection to advance the strip of blister packs when advanced by the motion member.

3. The apparatus as set forth in claim 1 wherein the discharging member comprises a discharging pawl pivoted to a lever pivotally repeatedly movable back and forth about an axis through a specified angle, the discharging pawl being movable past the projection of the blister pack without being thereby arrested when retracted by the lever and engageable with the projection to advance the strip of blister packs when advanced by the lever.

4. The apparatus as set forth in claim 1 wherein the discharging member comprises a pushing bar adapted to push out one strip of blister packs from the container without retraction of said pushing bar in a single forward movement.

5. The apparatus as set forth in claim 2 wherein the stroke of the discharging pawl is equal to the axial pitch of projections of the strip of blister packs.

6. The apparatus as set forth in claim 2 wherein the stroke of the discharging pawl is equal to the axial pitch of projections of the strip of blister packs multiplied by an integer greater than 1.

7. The apparatus as set forth in claim 3 wherein the stroke of the discharging pawl is equal to the axial pitch of projections of the strip of blister packs.

8. The apparatus as set forth in claim 3 wherein the stroke of the discharging pawl is equal to the axial pitch of projections of the strip of blister packs multiplied by an integer greater than 1.

9. The apparatus as set forth in claim 2 wherein the controlling means comprises a counter for detecting the cumulative total number of blister packs withdrawn by counting the strokes of the discharging pawl to thereby regulate the timing of operation of the cutter means.

10. The apparatus as set forth in claim 2 wherein the controlling means comprises a preset counter for presetting the number of strokes of the discharging pawl.

11. The apparatus as set forth in claim 4 wherein the pushing bar has a plurality of signal tracks transversely arranged in parallel and spaced apart by a distance corresponding to the axial pitch of projections of the strip of blister packs, the apparatus further including means for scanning the signal tracks to thereby detect the number of blister packs withdrawn based on the cumulative total amount of movement of the pushing bar.

12. The apparatus as set forth in claim 11 wherein the signal tracks are optical signal tracks and the means for scanning said optical tracks is a photoelectric converter.

13. The apparatus as set forth in claim 11 wherein the signal tracks are magnetic signal tracks and the means for scanning said magnetic signal tracks is a magnetic pickup.

14. The apparatus as set forth in claim 11 wherein the controlling means comprises a counter for detecting the number of blister packs based on the amount of movement of the pushing bar to thereby regulate the timing of operation of the cutter means.

15. The apparatus as set forth in claim 11 wherein the controlling means comprises a preset counter for presetting the number of blister packs withdrawn based on the amount of movement of the pushing bar.

16. The apparatus as set forth in claim 1 wherein means for holding the strip of blister packs against rising is disposed close to the blister pack exit.

17. The apparatus as set forth in claim 2 wherein means for arresting the strip of blister packs against retraction is disposed close to the blister pack exit.

18. The apparatus as set forth in claim 3 wherein means for arresting the strip of blister packs against retraction is disposed close to the blister pack exit.

19. Apparatus as claimed in claim 1 wherein said cutter means comprises a fixed blade member supported by said base plate laterally adjacent and immediately above said container exit so as to lie immediately adjacent the upper smooth surface of a blister pack strip extending from said exit, and a vertically movable cutter blade disposed normally below said container exit and movable upwardly between adjacent lower projections of said strip to cooperate with said fixed blade and sever a thin strip portion lying immediately adjacent said upper fixed blade between adjacent strip projections with minimal disturbance of the strip.

20. Apparatus as claimed in claim 19 further comprising resilient means supported by said base between said container and said cutter means for embracing and resiliently holding a strip portion containing at least the one of said projections lying immediately adjacent said cutter means so as to ensure reliable operation during and after severing between the ultimate and penultimate projections on a strip.

* * * * *